United States Patent [19]

Ishii et al.

[11] 3,962,096
[45] June 8, 1976

[54] SEPARATOR

[75] Inventors: Kiyoshi Ishii, Saitama; Takehisa Kubo, Ohmiya, both of Japan

[73] Assignee: Daicel, Ltd., Tokyo, Japan

[22] Filed: June 19, 1975

[21] Appl. No.: 588,308

[30] Foreign Application Priority Data

June 20, 1974   Japan................................ 49-70381

[52] U.S. Cl.................. 210/433 M; 210/456; 494 M
[51] Int. Cl.² ........................................ B01D 31/00
[58] Field of Search ............ 210/321 R, 494 M, 456, 210/433 M

[56] References Cited
UNITED STATES PATENTS

| | | | |
|---|---|---|---|
| 3,852,198 | 12/1974 | Murakami........................... | 210/321 |
| 3,872,014 | 3/1975 | Schell .............................. | 210/494 X |

*Primary Examiner*—Frank A. Spear, Jr.
*Attorney, Agent, or Firm*—Woodhams, Blanchard and Flynn

[57] ABSTRACT

A separator in which at least one tubular separating element comprising a semipermeable membrane in the shape of a lined envelope and a corrugated spacer which are wound spirally around a collecting pipe having a plurality of small transverse bores. The spacer is positioned between adjacent convolutions of the envelope and forms channels which extend substantially parallel to the collecting pipe. The inner part of the envelope is open to the outer periphery of the collecting pipe. The spacer is provided with notches in opposite edges thereof arranged so that the notches in the respective edges open in opposite circumferential directions. The notches allow passage of the liquid being treated, as well as objects for cleaning the membrane, from one channel to the next. The separator and the collecting pipe are housed in a pressure vessel. Cushion gaskets are pressed against the ends of the semipermeable film and the corrugated spacer thereby forming a continuous tortuous passage for flow of the liquid to be treated and for movement of membrane-cleaning objects.

2 Claims, 3 Drawing Figures

SEPARATOR

BACKGROUND OF THE INVENTION

1. Field of the Invention

This invention relates to an apparatus for separating solutes from liquids by a reverse osmosis process, and in particular it concerns an apparatus and the method of manufacturing same in which there is contained in a pressure vessel a tubular separating element or cartridge comprising a semipermeable film envelope and a corrugated spacer wound around a pipe for collecting the liquid that permeates through the film. The separating element defines a continuous uninterrupted channel through which can be passed the liquid to be treated, as well as objects to clean the film.

2. Description of the Prior Art

Heretofore, difficulties were encountered in processes for the separation and treatment of liquids in the reverse osmosis process because the semipermeable membrane surface becomes soiled and its permeability efficiency is reduced. It is well known that such soiled surfaces can be effectively cleaned by sponges and like cleaning members.

The type of spearator for which such a cleaning method can be employed is called a tubular-type separator and it has semipermeable films on the inner surfaces of outer tubes. These films can be scrubbed clean when sponge balls are pushed therethrough in a liquid stream. However, in this type of separator, the surface area of the film, per unit volume of the separator (sometimes called the filling efficiency), is low. Also one pressure resistant pipe is necessary for each tubular film. Further, it is necessary in this type of separator to connect several or more sections of tubular films with one another in series by using return conduit bends in order to obtain a desired total film surface area in the apparatus. This increases the number of parts required for the apparatus and is economically disadvantageous.

Another type of separator, called the spirally wound-type, is constructed by inserting a spacer between a flat semipermeable membrane film and winding the spacer and film together in a spiral fashion. A spirally wound-type separator cannot be cleaned by sponge balls or the like, but it is excellent in the filling efficiency per unit volume. Thus, the second type of separator is mainly used in industry.

The present invention provides a separator which retains the advantages, but eliminates the defects, of both of the above-mentioned respective types of separation apparatuses.

SUMMARY OF THE INVENTION

The features of the present invention apparatus will now be explained in detail by reference to the steps for the manufacture thereof.

1. A separating element constituting the principal part of the present invention structure is constructed by forming two layers of a semipermeable film into an envelope. A lining capable of allowing the passage of the permeated liquid and also sufficiently rigid to support the inner surfaces of the film layers when the cleaning member is pressed against the outer surfaces thereof is inserted between the two layers of the envelope. One end of the semipermeable film envelope communicates with a collecting pipe having small bores to collect the liquid which has passed through the semipermeable film into the internal compartment of the envelope containing the lining. The periphery of the envelope is tightly sealed. A corrugated spacer is placed on the envelope, and the spacer and envelope are wound in a spiral fashion around the collecting pipe so that the spacer is disposed between and spaces apart adjacent turns or convolutions of the envelope. The ridges and grooves of the spacer define channels which extend parallel to the longitudinal axis of the collecting pipe. The opposite edges of the spacer have notches to provide communication between adjacent channels so that the liquid to be treated, as well as objects for cleaning the film, can move from one channel to the next in series.

2. The tubular separating element or cartridge thus obtianed is placed in a pressure vessel. The vessel has closure members, such as flanges, provided with an inlet for the liquid to be treated, an outlet for the concentrated liquid and an outlet for the collecting pipe for the permeated liquid. On the inner surface of the flanges there are provided resiliently compressible gaskets which are lightly pressed against the semipermeable film at both ends of the tubular separating element and also against the ends of corrugated spacer, whereby to close the ends of the channels through which flows the liquid to be treated.

3. The separator having the structure as above-mentioned in accordance with the present invention has a tortuous continuous flow passage formed by the semipermeable film, the corrugated spacer and the gaskets. Therefore, it is possible for the present apparatus to achieve the same purposes as the tubular-type separator even though flat semipermeable films are used. Furthermore, it is far more efficient when compared to the tubular-type in respect of its capacity per volume (filling efficiency of film).

A preferred embodiment of the present invention is now explained in detail by reference to the accompanying drawings.

DETAILED DESCRIPTION OF THE PREFERRED EMBODIMENT

Figure 1:
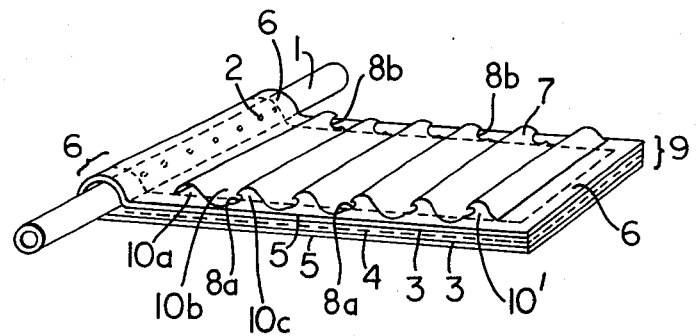
FIG. 1 is a perspective view of the water collecting pipe, the semipermeable membrane envelope and the spacer prior to coiling the envelope and spacer around the pipe.

As shown in FIG. 1, the semipermeable membrane or film 5 is formed on a lining 3 made of canvas or the like so that the lining acts as a porous, flexible, strengthening support for the film. The film 5 is folded in two and is placed around the collecting pipe 1 so that the lining layers 3,3 are positioned innermost and facing each other, and the film layers 5,5 are positioned outermost and facing away from each other. The collecting pipe 1 has small lateral bores 2 to collect the water which has passed through the film 5 and to discharge the same outside the pressure vessel, as described hereinbelow. A porous net 4, such as a metal or plastic mesh screen, is inserted between the two opposing lining layers 3,3 to impart the rigidity required so that the linings 3,3 will act as a channel to collect the liquid that has permeated through the semipermeable film 5.

In the present embodiment, a cellulose acetate semipermeable film or membrane 5 is used, but any semipermeable film can be used so long as it has the mechanical strength required for winding the film 5 in a spiral fashion and so long as it can be sealed fluid-tight at the margins thereof.

Figure 2:
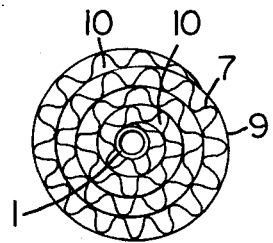
FIG. 2 is a schematic end view of the water collecting pipe with the semipermeable membrane and the spacer spirally wound thereon.

Using epoxy type resins, or similar sealing means, a continuous marginal sealing zone 6 having a width of about 2 – 3 cm is provided between the film layers and lining layers along both side edges and the free end thereof. The net 4 and the film 5 are thereby sealed together to form a sealed envelope 9 which separates the zone for containing the liquid being treated (feed liquid) from the internal compartment through which flows the liquid that has permeated through the film 5 (purified liquid). An elongated corrugated spacer 7 made of flexible and corrosion material such as polyethylene, polypropylene or corrosion-resistant aluminum is provided. The spacer 7 has notches 8 in the lateral edges thereof to allow the passage of the liquid to be treated and the cleaning objects from one groove to the adjacent groove in the spacer. The notches 8 are provided on the inclined surfaces or flanks of the corrugated spacer 7, that is, the surfaces on either side of the crests of the corrugated spacer as appearing in FIG. 1. The notches along each lateral edge of the spacer all open in the same direction, and the sets of notches along the respectively opposite lateral edges of the spacer open in opposite directions. Thus, the notches 8a all open leftwardly as appearing in FIG. 1 and the notches 8b open rightwardly as appearing in FIG. 1. The spacer 7 is placed on the semipermeable film envelope 9 and the two are wound together in a spiral fashion around the collecting pipe 1. The resulting assembly is schematically shown in FIG. 2 which depicts separating element channels 10 that extend in the longitudinal direction of the collecting tube 1. These channels 10 are formed by the semipermeable envelope 9 having its two semipermeable film surfaces 5,5 substantially sealingly contacting the crests of the ridges and grooves of the corrugated spacer 7. These channels 10 allow the passage of the liquid to be treated, as well as cleaning objects, therethrough.

At this stage, the channels 10 are not closed at the ends thereof.

Figure 3:
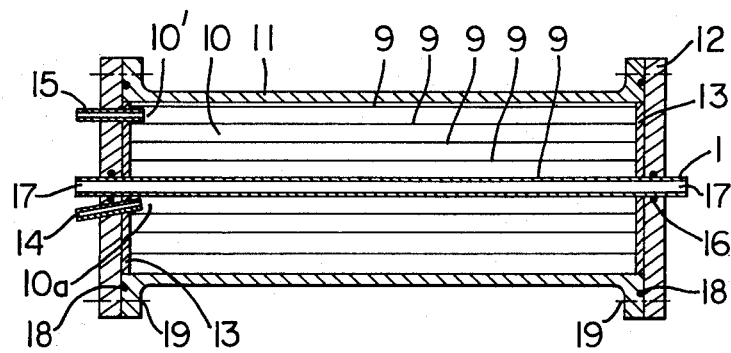
FIG. 3 is a schematic central sectional view of the assembled separator apparatus.

The tubular separating element thus formed is placed within a pressure vessel 11 as shown in FIG. 3 and is held therein by means of flanges 12 which are lined with resiliently compressible annular gaskets 13 so that the gaskets are in light sealing contact with the edges of the semipermeable envelope 9 and of the corrugated spacer 7. By thus assembling the separating element with the flanges 12, the channels 10 which heretofore had been open at their ends, are now closed whereby to form a tortuous or zig-zig continuous passage.

The liquid to be treated (feed liquid) is flowed into the innermost channel 10a and flows lengthwise therein, and then passes through notch 8b into channel 10b, thence lengthwise in channel 10b and through notch 8a into the next channel 10c and so on in like fashion. When cleaning of the film 5 is desired, cleaning elements such as sponge balls can be moved through the channels 10 and notches 8, under hydrostatic pressure, in like fashion. The gaskets 13 seal the ends of the channels 10 to minimize or eliminate leakage of the liquid flowing through the channels.

The flange 12 has an inlet 14 for the liquid to be treated. The liquid is fed therein under pressure and is introduced into the channel 10a so that the liquid flows through the channels and notches as above-described. The outlet 15 for the concentrated liquid is placed in communication with the final channel 10'.

Alternatively, the positions of the inlet 14 and outlet 15 can be reversed.

The collecting pipe 1 extends through the flanges 12 and is sealed by 0 rings 16. The collecting pipe 1 provides the outlet 17 at one or both ends thereof for the permeated liquid. The pressure vessel 11 and the flanges 12 are sealed by bolts and nuts 19 and 0 rings 18 so as to maintain the pressure in the container 11.

The apparatus according to the present invention achieves the following effects. The apparatus provides a far higher filling efficiency, that is, the total area of the semipermeable film per unit volume is high in comparison with the tubular type and yet it is possible to scrub clean the film surface with sponge balls, etc. In the preparation of the separating element, there is used a flat semipermeable film which can be prepared at a very high efficiency, under simple conditions.

As is well known, reverse osmosis apparatus can be used for various purposes, such as to remove solutes from saline waters to purify the water and to concentrate fruit juices, etc.

The embodiments of the invention in which an exclusive property or privilege is claimed are defined as follows:

1. A reverse osmosis separating apparatus, comprising: a pressure vessel having a chamber therein; a reverse osmosis separator cartridge disposed in said chamber, said cartridge comprising a centrally located collecting pipe for discharging permeated liquid, a flexible envelope comprising a semipermeable reverse osmosis membrane defining an internal sealed compartment having a liner therein, said compartment being in fluid-flow communication with said collecting pipe so that flow of feed liquid in contact with the external surface of said membrane will cause liquid to permeate into said compartment and thence flow into said water-collecting pipe for discharge from the vessel, a flexible corrugated spacer extending along the envelope from a position adjacent the collecting pipe to substantially the outer end of said envelope, said spacer having alternating ridges and grooves defining channels that extend substantially parallel to the collecting pipe, said spacer having inclined wall portions extending between the crests of said ridges and grooves, the correspondingly inclined wall portions adjacent to one edge of said spacer having a first set of notches therein, and the corresponding oppositely inclined wall portions adjacent to the other edge of said spacer having a second set of notches therein with the first and second sets of notches opening in opposite directions to provide communication between adjacent channels, said envelope and said spacer being spirally wound around said collecting pipe so that the spacer is positioned between adjacent turns of said envelope and the crests of the ridges and grooves of the spacer substantially sealingly contacting the membrane whereby the channels define flow passages for the feed liquid; resiliently compressible gaskets sealingly contacting and closing the opposite ends of the channels so that the feed liquid flows through said flow passages in series and flows through said notches when moving from one flow passage to the next; means for feeding the feed liquid into a flow passage adjacent one end of said spacer and means for removing concentrated liquid from a flow passage adjacent the opposite end of said spacer.

2. An apparatus as claimed in claim 1 in which said semipermeable reverse osmosis membrane is substantially rectangular and is folded in two with said collecting pipe being disposed at the fold so that the membrane forms two spacedapart layers, and sealing material between said layers along the marginal edges of the membrane to form said sealed compartment between said layers, said collecting pipe having transverse opening means communicating with said compartment.

* * * * *